United States Patent
Sun et al.

(10) Patent No.: US 9,453,450 B2
(45) Date of Patent: Sep. 27, 2016

(54) METHOD OF ESTIMATING ENGINE-OUT NOX MASS FLOW RATE

(71) Applicant: GM GLOBAL TECHNOLOGY OPERATIONS LLC, Detroit, MI (US)

(72) Inventors: Min Sun, Troy, MI (US); Igor Anilovich, Walled lake, MI (US); Nagini Devarakonda, New Hudson, MI (US); Pablo Hernandez Garcia, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 14/299,285

(22) Filed: Jun. 9, 2014

(65) Prior Publication Data

US 2015/0354428 A1 Dec. 10, 2015

(51) Int. Cl.
*F02D 41/14* (2006.01)
*F01N 11/00* (2006.01)
*F01N 9/00* (2006.01)
*F02D 21/08* (2006.01)
*F02D 41/00* (2006.01)
*F02D 41/22* (2006.01)

(52) U.S. Cl.
CPC ............ *F01N 11/00* (2013.01); *F01N 9/00* (2013.01); *F01N 9/005* (2013.01); *F01N 9/007* (2013.01); *F01N 11/007* (2013.01); *F02D 21/08* (2013.01); *F02D 41/0072* (2013.01); *F02D 41/1445* (2013.01); *F02D 41/1461* (2013.01); *F02D 41/1462* (2013.01); *F02D 41/222* (2013.01); *F01N 2560/026* (2013.01); *F01N 2560/07* (2013.01); *F01N 2900/0412* (2013.01); *F01N 2900/0416* (2013.01); *F01N 2900/08* (2013.01); *F01N 2900/1402* (2013.01)

(58) Field of Classification Search
CPC ............ F02D 41/146; F02D 41/1461; F02D 41/1462; F02D 41/1463; F02D 41/1465; F02D 21/08; F02D 41/0072; F02D 41/1445; F02D 41/222; G01M 15/102; Y02T 10/47; Y02T 10/40; F01N 11/00; F01N 2560/026; F01N 9/00; F01N 9/005; F01N 9/007; F01N 2560/07; F01N 2900/0412; F01N 2900/0416; F01N 2900/08; F01N 2900/1402
USPC ........ 701/101, 102, 109; 123/672, 674, 679, 123/590, 691, 692; 73/114.71, 114.73, 73/114.77
See application file for complete search history.

(56) References Cited

U.S. PATENT DOCUMENTS

| | | | |
|---|---|---|---|
| 8,635,030 B2 * | 1/2014 | Zanetti | F01N 3/208 60/276 |
| 2008/0149081 A1 * | 6/2008 | Allain | F02D 41/021 123/568.21 |
| 2012/0124970 A1 * | 5/2012 | Lee | F01N 13/009 60/286 |

*Primary Examiner* — Hai Huynh
*Assistant Examiner* — Raza Najmuddin
(74) *Attorney, Agent, or Firm* — Quinn Law Group, PLLC (57) ABSTRACT

A method of estimating a mass flow rate of nitrogen oxides in exhaust gas includes sensing a mass flow rate of a flow of exhaust gas from the engine. A nitrogen oxides base concentration for when the engine is operating at a reference state is defined, and a nitrogen oxides ratio for a current operating state of the internal combustion engine is calculated. The mass flow rate of the flow of exhaust gas, the nitrogen oxides base concentration, and the nitrogen oxides ratio for the current operating state of the engine are multiplied together to define an estimated value of the current mass flow rate of nitrogen oxides in the flow of exhaust gas from the engine. The estimated value of the mass flow rate of nitrogen oxides may be compared to the output from a nitrogen oxides sensor to determine proper functionality of the nitrogen oxides sensor.

18 Claims, 3 Drawing Sheets

METHOD OF ESTIMATING ENGINE-OUT NOX MASS FLOW RATE

TECHNICAL FIELD

The disclosure generally relates to a method of estimating a mass flow rate of nitrogen oxides (NOx) in exhaust gas of an engine, and to a method of diagnosing a nitrogen oxides sensor of an exhaust gas treatment system.

BACKGROUND

Vehicles include an exhaust gas treatment system for treating a flow of exhaust gas from an engine. The exhaust gas treatment system may include one or more catalytic devices that oxidize nitrogen oxides with a catalyst, such as a diesel particular filter or a selective catalytic reduction unit. Typically, a nitrogen oxides sensor is disposed downstream of the catalytic device, to sense the level of nitrogen oxides present in the flow of exhaust gas downstream of the catalytic devices. Feedback from the nitrogen oxides sensor(s) is used to control the operation of the engine and/or the exhaust gas treatment system. Accordingly, it is important to ensure that the nitrogen oxides sensor(s) are operating properly, and providing an accurate measurement of the nitrogen oxides in the exhaust gas. On-board diagnostics are used to determine if the nitrogen oxide sensor(s) are operating properly.

An on-board diagnostic system may compare a level of nitrogen oxides in the exhaust gas that was sensed or measured by the nitrogen oxides sensor, to an estimated value of nitrogen oxides expected to be present in the exhaust gas for the specific, current operating conditions of the engine. If the sensed level of nitrogen oxides is approximately equal to the estimated value of nitrogen oxides, then the on-board diagnostic system may determine that the nitrogen oxides sensors are operating properly. However, if the sensed level of nitrogen oxides is not approximately equal to the estimated value of nitrogen oxides, then the on-board diagnostic system may determine that the nitrogen oxides sensors are not operating properly, and may signal a maintenance alert.

SUMMARY

A method of estimating a mass flow rate of nitrogen oxides (NOx) in exhaust gas produced by an engine is provided. The method includes sensing a mass flow rate of a flow of exhaust gas from the engine. A nitrogen oxides base concentration for when the engine is operating at a reference state is defined by an engine control unit. A nitrogen oxides ratio for a current operating state of the internal combustion engine is calculated by the engine control unit. The mass flow rate of the flow of exhaust gas, the nitrogen oxides base concentration, and the nitrogen oxides ratio for the current operating state of the engine are multiplied together to define an estimated value of the current mass flow rate of nitrogen oxides in the flow of exhaust gas from the engine.

Accordingly, the product of the mass flow rate of exhaust gas and the nitrogen oxides base concentration provides an estimate of how much nitrogen oxides the engine produces at a reference operating state, such as a steady state test condition. The nitrogen oxides ratio is a multiplier that adjusts this product to account for the current operating states of the engine. Accordingly, multiplying the product of the mass flow rate and the nitrogen oxides base concentration by the nitrogen oxides ratio provides an estimate for the amount of nitrogen oxides output from the engine at the current operating states.

An on-board diagnostic controller may compare the estimated value of the current mass flow rate of nitrogen oxides in the flow of exhaust gas to a sensed value of the mass flow rate of nitrogen oxides in the flow of exhaust gas, sensed by a nitrogen oxides sensor of an exhaust gas treatment system, to determine if the nitrogen oxides sensor is operating properly. If the sensed level of nitrogen oxides is approximately equal to the estimated value of nitrogen oxides, then the on-board diagnostic engine control unit may determine that the nitrogen oxides sensors are operating properly. However, if the sensed level of nitrogen oxides is not approximately equal to the estimated value of nitrogen oxides, then the on-board diagnostic engine control unit may determine that the nitrogen oxides sensors are not operating properly, and may signal a maintenance alert.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
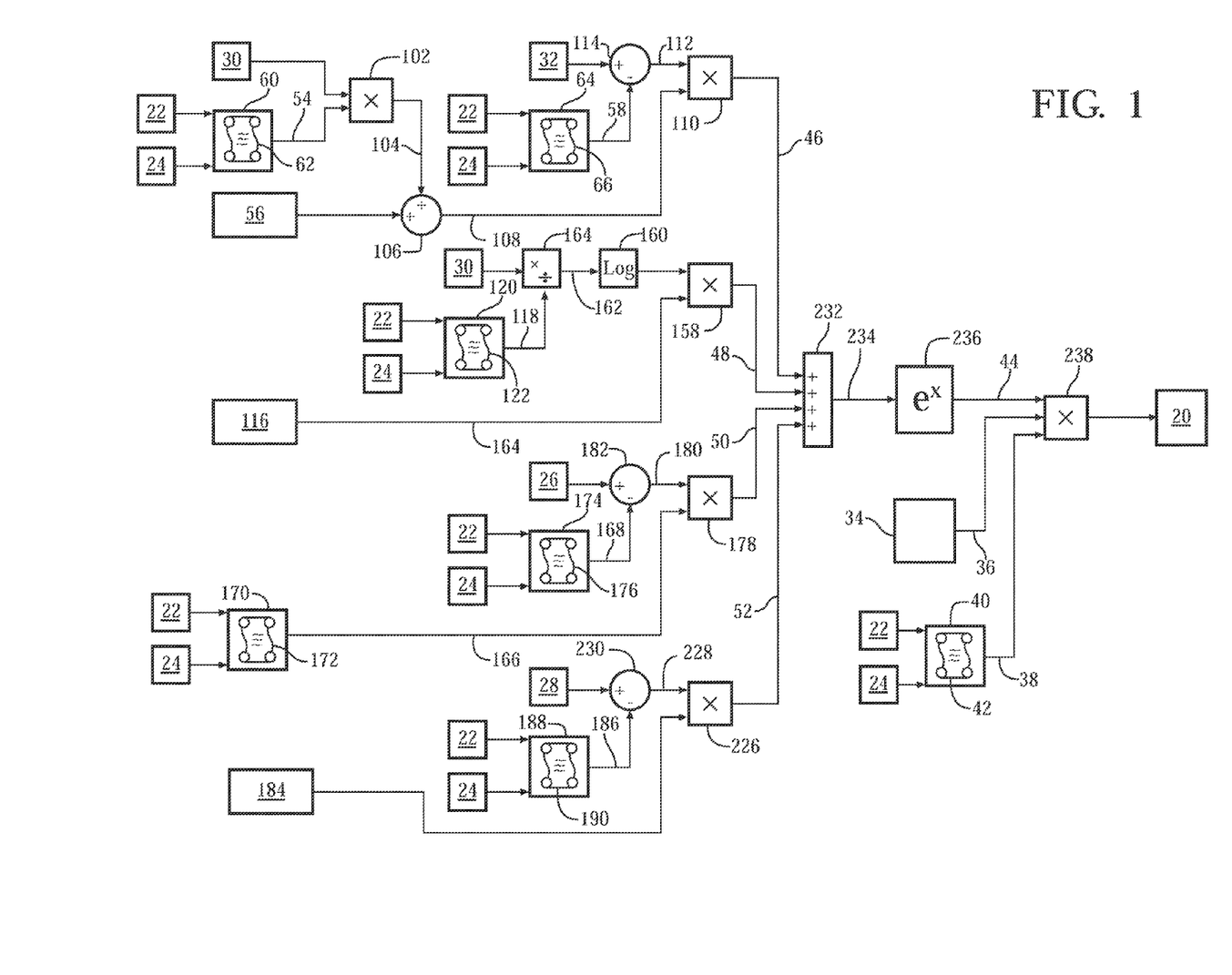
FIG. 1 is schematic diagram showing a mapping structure for estimating the mass flow rate of nitrogen oxide in the flow of exhaust gas from the engine.

Referring to the Figures, wherein like numerals indicate like parts throughout the several views, a mapping structure/flowchart showing a method of estimating a mass flow rate of nitrogen oxides 20 (NOx) in a flow of exhaust gas from an engine is generally shown in FIG. 1. The method is used to estimate the mass flow rate of nitrogen oxides 20 in the exhaust gas of the engine, such as but not limited to, a diesel engine, at a current operating state. The current mass flow rate of nitrogen oxides 20 at the current operating state of the engine may be tracked over time, and used to control the engine and/or an exhaust gas treatment system, and may also be used to diagnose a nitrogen oxides sensor of the exhaust gas treatment system.

The current operating state of the engine encompasses various different operating parameters of the engine at any given time. As such, the current operating state of the engine changes over time as the different operating parameters of the engine are changed. The different operating parameters of the engine that may be adjusted to change the current operating state of the engine include, but are not limited to, a rotational speed 22 of the engine, a fuel injection rate 24 of the engine, a fuel injection pressure 26 of the engine, a fuel injection timing 28 of the engine, an air/fuel ratio 30 of the engine, and an exhaust gas recirculation ratio 32 of the engine.

The rotational speed 22 of the engine may be defined as the rotational speed at which a crankshaft of the engine rotates. The fuel injection rate 24 of the engine may be defined as the quantity of fuel injected into the engine during a specified period of time. The fuel injection pressure 26 of the engine may be defined as the pressure (e.g., psi) of the fuel when injected into the engine for combustion. The fuel injection timing 28 of the engine may be defined as the position of a piston during a piston stroke at which the fuel is injected into a respective cylinder of the piston. The air/fuel ratio 30 of the engine may be defined as the amount of fuel mixed with a pre-defined quantity of air, which is injected into the cylinders of the engine. The exhaust gas recirculation ratio 32 may be defined as the amount or percentage of exhaust gas that is recirculated into the intake air of the engine for injection into the cylinders of the engine for combustion.

The vehicle may include a controller, such as an engine control unit, to control and/or monitor the operation of the engine and/or an exhaust gas treatment system of the engine. The controller may include a computer and/or processor, and include all software, hardware, memory, algorithms, connections, sensors, etc., necessary to manage, monitor, and control the operation of the engine and the exhaust gas treatment system. As such, the method described below may be embodied as a program operable on the controller. It should be appreciated that the controller may include any device capable of analyzing data from various sensors, comparing data, making the necessary decisions required to control the operation of the engine and/or exhaust gas treatment system, and perform the various calculations required to calculate the current mass flow rate of nitrogen oxides 20 in the exhaust gas from the engine.

Referring to FIG. 1, the method includes sensing, generally indicated by box 34, a mass flow rate 36 of the flow of exhaust gas from the engine. The mass flow rate 36 of the exhaust gas is the mass of exhaust gas that passes through the exhaust gas treatment system of the engine per unit of time. The mass flow rate 36 of the exhaust gas may be sensed in any suitable manner.

The method may further include sensing and/or otherwise determining the various operating parameters of the engine at the current operating state of the engine. Specifically, the method may include sensing and/or determining the air/fuel ratio 30 of the engine at the current operating state, sensing and/or determining the exhaust gas recirculation ratio 32 of the engine at the current operating state, sensing and/or determining the fuel injection timing 28 of the engine at the current operating state, sensing and/or determining the fuel injection pressure 26 of the engine at the current operating state, sensing and/or determining the rotational speed 22 of the engine at the current operating state, and sensing and/or determining the fuel injection rate 24 of the engine at the current operating state.

A nitrogen oxides base concentration 38 of the engine is defined for when the engine is operating at a reference state. The reference state may be any specific operating state of the engine, but is typically defined as a steady state operating condition at defined operating parameters. For example, the reference state may include an engine idle condition with all of the various operating parameters of the engine set at a pre-defined limit/rate. The nitrogen oxides base concentration 38 is the concentration of nitrogen oxides in the flow of exhaust gas that the engine produces while the engine is operating at the reference state.

As shown in FIG. 1, defining, generally indicated by box 40, the nitrogen oxides base concentration 38 of the engine for when the engine is operating at the reference state, may include referencing a base nitrogen oxides table 42 stored in the memory of the controller. The base nitrogen oxides table 42 may be defined as a two dimensional table, that uses two input values to define an output value. The nitrogen oxides base concentration 38 of the engine at the reference state is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the base nitrogen oxides table 42, to look-up and/or define the value for the nitrogen oxides base concentration 38 of the engine at the reference state.

Referring to FIG. 1, a nitrogen oxides ratio 44 for the current operating state of the engine is calculated. The manner in which the nitrogen oxides ratio 44 is calculated is described in detail below. The mass flow rate 36 of the exhaust gas, the nitrogen oxides base concentration 38, and the nitrogen oxides ratio 44 are then multiplied together to define an estimated value of the current mass flow rate of nitrogen oxides 20 in the exhaust gas from the engine. Accordingly, the estimated value of the current mass flow rate of nitrogen oxides 20 in the exhaust gas from the engine is calculated from Equation 1:

$$MFR\_NOx = (M_{exh})(NOx_{base})(NOxratio); \qquad 1)$$

wherein the MFR_NOx is the current mass flow rate of nitrogen oxides 20 in the exhaust gas from the engine at the current operating state, $M_{exh}$ is the mass flow rate 36 of exhaust gas at the current operating state of the engine, $NOx_{base}$ is the nitrogen oxides base concentration 38 of the engine when operating at the reference state, and NOxratio is the nitrogen oxides ratio 44 for the current operating state of the engine.

The nitrogen oxides ratio 44 relates the mass flow rate of nitrogen oxides in the exhaust gas produced by the engine at the current operating state to the mass flow rate of nitrogen oxides in the exhaust gas produced by the engine at the reference state. The nitrogen oxides ratio 44 of the engine is calculated from Equation 2:

$$NOxratio = e^{((EGRpor)+(AFRpor)+(InjPpor)+(InjTpor))} \qquad 2)$$

wherein e is the base of the natural logarithm, and is the mathematical constant often referred to as Euler's Number, the EGRpor is an exhaust gas recirculation portion 46 of the nitrogen oxides ratio 44 AFRpor is an air/fuel ratio portion 48 of the nitrogen oxides ratio 44, InjPpor is a fuel injection pressure portion 50 of the nitrogen oxides ratio 44, and InjTpor is a fuel injection timing portion 52 of the nitrogen oxides ratio 44

The exhaust gas recirculation portion 46 (EGRpor) is calculated from Equation 3:

$$EGRpor = [(a_{EGR})(AFR)+(f_{EGR})][(EGR)-(EGR_{base})]; \qquad 3)$$

wherein EGR is the exhaust gas recirculation ratio 32 of the engine at the current operating state, $a_{EGR}$ is an EGR term coefficient 54 for the air/fuel ratio 30, fEGR is a functional timing value 56 for the exhaust gas recirculation portion 46 of the nitrogen oxides ratio 44, and $EGR_{base}$ is an exhaust gas recirculation base ratio 58 of the engine when the engine is operating at the reference state.

The EGR term coefficient 54 is a function of the rotational speed 22 of the engine and the fuel injection rate 24 of the engine. The EGR term coefficient 54 is a constant for any given combination of the rotational speed 22 and the fuel injection rate 24 of the engine. The EGR term coefficient 54 is determined from test data generated for each combination of the rotational speed 22 and the fuel injection rate 24 of the specific engine being used.

Referring to FIG. 1, defining and/or determining the EGR term coefficient 54 ($a_{EGR}$), generally indicated by box 60, which is used to calculate the exhaust gas recirculation portion 46 of the nitrogen oxides ratio 44, may include referencing an EGR term table 62 stored in the memory of the controller. The EGR term table 62 may be defined as a two dimensional table, that uses two input values to define an output value. The EGR term coefficient 54 used to calculate the exhaust gas recirculation portion 46 of the nitrogen oxides ratio 44 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the EGR term table 62, to look-up and/or define the value for the EGR term coefficient 54 used to calculate the exhaust gas recirculation portion 46 of the nitrogen oxides ratio 44.

The exhaust gas recirculation base ratio 58 ($EGR_{base}$) is the exhaust gas recirculation ratio of the engine when the engine is operating at the reference state. As shown in FIG. 1, defining and/or determining the exhaust gas recirculation base ratio 58 ($EGR_{base}$), generally indicated by box 64, which is used to calculate the exhaust gas recirculation portion 46 of the nitrogen oxides ratio 44, may include referencing an EGR base table 66 stored in the memory of the controller. The EGR base table 66 may be defined as a two dimensional table, that uses two input values to define an output value. The exhaust gas recirculation base ratio 58 used to calculate the exhaust gas recirculation portion 46 of the nitrogen oxides ratio 44 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the EGR base table 66, to look-up and/or define the value for the exhaust gas recirculation base ratio 58 used to calculate the exhaust gas recirculation portion 46 of the nitrogen oxides ratio 44.

The functional timing value 56 (fEGR) for the exhaust gas recirculation portion 46 of the nitrogen oxides ratio 4 is determined based upon the rotational speed 22 of the engine at the current operating state, the fuel injection rate 24 of the engine at the current operating state, and the fuel injection timing 28 of the engine at the current operating state. The functional timing value 56 for the exhaust gas recirculation portion 46 of the nitrogen oxides ration 44 is determined or calculated from Equation 4:

$$f_{EGR}=(f((b_1)(InjT)+b_2))+b_3 \qquad 4)$$

wherein $b_1$ is a coefficient 68 for the fuel injection timing 28; $b_2$ is an adjustment value 70 for the fuel injection timing 28 of the engine; $b_3$ is an adjustment value 72 of the functional timing value 56 for the exhaust gas recirculation portion 46; and InjT is the fuel injection timing 28 of the engine at the current operating state of the engine. The functional timing value 56 (fEGR) for the exhaust gas recirculation portion 46 is determined and/or calculated from the coefficient 68 ($b_1$) for the fuel injection timing 28 of the engine, the fuel injection timing 28 of the engine at the current operating state, the adjustment value 70 ($b_2$) for the fuel injection timing 28 of the engine, and the adjustment value 72 ($b_3$) for the functional timing value 56.

Figure 2:
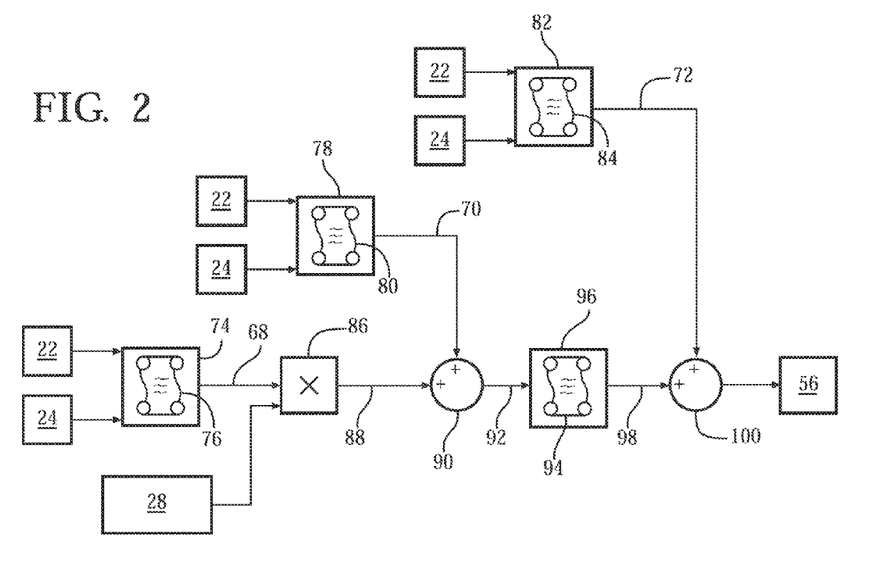
FIG. 2 is a schematic diagram showing a mapping structure for determining a functional timing value of an exhaust gas recirculation ratio of the engine.

Referring to FIG. 2, the coefficient 68 ($b_1$) for the fuel injection timing 28 is determined and/or defined, generally indicated by box 74, by referencing an EGR-B1 input table 76 stored in the memory of the controller. The EGR-B1 input table 76 may be defined as a two dimensional table, that uses two input values to define an output value. The coefficient 68 ($b_1$) for the fuel injection timing 28 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the EGR-B1 input table 76, to look-up and/or define the value for the coefficient 68 ($b_1$) for fuel injection timing 28.

The coefficient 68 ($b_1$) is a function of the rotational speed 22 of the engine and the fuel injection rate 24 of the engine. The coefficient 68 ($b_1$) is a constant for any given combination of the rotational speed 22 and the fuel injection rate 24 of the engine. The coefficient 68 ($b_1$) is determined from test data generated for each combination of the rotational speed 22 and the fuel injection rate 24 of the specific engine being used.

As shown in FIG. 2, the adjustment value 70 ($b_2$) for the fuel injection timing 28 is determined and/or defined, generally indicated by box 78, by referencing an EGR-B2 adjustment table 80 stored in the memory of the controller. The EGR-B2 adjustment table 80 may be defined as a two dimensional table, that uses two input values to define an output value. The adjustment value 70 ($b_2$) for the fuel injection timing 28 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the EGR-B2 adjustment table 80, to look-up and/or define the value for the adjustment value 70 ($b_2$) for the fuel injection timing 28.

The adjustment value 70 ($b_2$) for the fuel injection timing 28 is a function of the rotational speed 22 of the engine and the fuel injection rate 24 of the engine. The adjustment value 70 ($b_2$) is a constant for any given combination of the rotational speed 22 and the fuel injection rate 24 of the engine. The adjustment value 70 ($b_2$) is determined from test data generated for each combination of the rotational speed 22 and the fuel injection rate 24 of the specific engine being used.

As shown in FIG. 2, the adjustment value 72 ($b_3$) for the functional timing value 56 of the exhaust gas recirculation portion 46 is determined and/or defined, generally indicated by box 82, by referencing an EGR-B3 adjustment table 84 stored in the memory of the controller. The EGR-B3 adjustment table 84 may be defined as a two dimensional table, that uses two input values to define an output value. The adjustment value 72 ($b_3$) for the functional timing value 56 of the exhaust gas recirculation portion 46 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the EGR-B3 adjustment table 84, to look-up and/or define the value for the adjustment value 72 ($b_3$) for the functional timing value 56 of the exhaust gas recirculation portion 46.

The adjustment value 72 ($b_3$) for the functional timing value 56 of the exhaust gas recirculation portion 46 is a function of the rotational speed 22 of the engine and the fuel injection rate 24 of the engine. The adjustment value 72 ($b_3$) is a constant for any given combination of the rotational speed 22 and the fuel injection rate 24 of the engine. The adjustment value 72 ($b_3$) is determined from test data generated for each combination of the rotational speed 22 and the fuel injection rate 24 of the specific engine being used.

As shown in FIG. 2, the fuel injection timing 28 (InjT) of the engine at the current operating state is multiplied, generally indicated by box 86, by the coefficient 68 ($b_1$) for the fuel injection timing 28 to define a product 88. The product 88 of the fuel injection timing 28 and the coefficient 68 ($b_1$) for the fuel injection timing 28 is then added, generally indicated by box 90, to the value of the adjustment value 70 ($b_2$) for the fuel injection timing 28 to define a sum 92. The sum 92 is then used as an input into an EGR calibration table 94. The EGR calibration table 94 is a one dimensional table that uses a single input to define a single output value. Accordingly, the output value of the EGR calibration table 94 defines a value 98 of the function $f((b_1)(InjT)+b_2)$. As such, the function $f((b_1)(InjT)+b_2)$ is determined, generally indicated by box 96, from the EGR calibration table 94 based upon the sum 92. Accordingly, the controller may use the sum 92 as the single input into the EGR calibration table 94, to look-up and/or define the value 98 for the function $f((b_1)(InjT)+b_2)$.

The EGR calibration table 94 is universal for the rotational speed 22 and the fuel rate of the engine. The EGR calibration table 94 is developed by adjusting the values of the EGR calibration table 94 to achieve the best estimation of nitrogen oxides mass flow rate at all engine speed 22 and fuel injection rate 24 conditions.

As shown in FIG. 2, the value 98 for the function $f((b_1)(InjT)+b_2)$ is then added, generally indicated by box 100, to the adjustment value 72 ($b_3$) for the functional timing value 56 of the exhaust gas recirculation portion 46 to define and/or calculate the functional timing value 56 (fEGR) of the exhaust gas recirculation portion 46 of the nitrogen oxides ratio 4.

Referring back to FIG. 1, the air/fuel ratio 30 (AFR) of the engine at the current operating state is multiplied, generally indicated by box 102, by the EGR term coefficient 54 used to calculate the exhaust gas recirculation portion 46 of the nitrogen oxides ratio 4, to define a product 104. The product 104 of the air/fuel ratio 30 (AFR) of the engine at the current operating state and the EGR term coefficient 54 used to calculate the exhaust gas recirculation portion 46 of the nitrogen oxides ratio 4 is added, generally indicated by box 106, to the functional timing value 56 (fEGR) of the exhaust gas recirculation portion 46, to define an EGR portion sum 108. The EGR portion sum 108 is then multiplied, generally indicated by box 110, by a difference 112 between the exhaust gas recirculation ratio 32 (EGR) of the engine at the current operating state and the exhaust gas recirculation base ratio 58 ($EGR_{base}$) used to calculate the exhaust gas recirculation portion 46 of the nitrogen oxides ratio 4 to calculate the exhaust gas recirculation portion 46 (EGRpor) of the nitrogen oxides ratio 4. Calculation of the difference 112 between the exhaust gas recirculation ratio 32 (EGR) of the engine at the current operating state and the exhaust gas recirculation base ratio 58 ($EGR_{base}$) is generally indicated by box 114.

The air/fuel ratio portion 48 (AFRpor) is calculated from Equation 5:

$$AFRpor = (f_{AFR})\ln\left(\frac{AFR}{AFR_{base}}\right); \quad 5)$$

wherein AFR is the air/fuel ratio 30 of the engine at the current operating state, $f_{AFR}$ is a functional timing value 116 for the air/fuel ratio portion 48 of the nitrogen oxides ratio 44, and $AFR_{base}$ is an air/fuel ratio base value 118 of the engine when the engine is operating at the reference state.

The air/fuel ratio base value 118 ($AFR_{base}$) is the air/fuel ratio of the engine when the engine is operating at the reference state. As shown in FIG. 1, defining and/or determining the air/fuel ratio base value 118 ($AFR_{base}$), generally indicated by box 120, which is used to calculate the air/fuel ratio portion 48 of the nitrogen oxides ratio 4, may include referencing an AFR base table 122 stored in the memory of the controller. The AFR base table 122 may be defined as a two dimensional table, that uses two input values to define an output value. The air/fuel ratio base value 118 used to calculate the air/fuel ratio portion 48 of the nitrogen oxides ratio 4 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the AFR base table 122, to look-up and/or define the value for the air/fuel ratio base value 118 used to calculate the air/fuel ratio portion 48 of the nitrogen oxides ratio 4.

The functional timing value 116 ($f_{AFR}$) of the air/fuel ratio portion 48 of the nitrogen oxides ratio 4 is determined based upon the rotational speed 22 of the engine at the current operating state, the fuel injection rate 24 of the engine at the current operating state, and the fuel injection timing 28 of the engine at the current operating state. The functional timing value 116 of the air/fuel ratio portion 48 is determined or calculated from Equation 6:

$$f_{AFR}=(f((b_1)(InjT)+b_2))+b_3 \quad 6)$$

wherein $b_1$ is a coefficient 124 for the fuel injection timing 28; $b_2$ is an adjustment value 126 for the fuel injection timing 28 of the engine; $b_3$ is an adjustment value 128 of the functional timing value 116 of air/fuel ratio portion 48; and InjT is the fuel injection timing 28 of the engine at the current operating state of the engine. The functional timing value 116 ($f_{AFR}$) of the air/fuel ratio portion 48 is determined and/or calculated from the coefficient 124 $b_1$ for the fuel injection timing 28 of the engine, the fuel injection timing 28 of the engine at the current operating state, the adjustment value 126 $b_2$ for the fuel injection timing 28 of the engine, and the adjustment value 128 $b_3$ for the functional timing value 116 of the air/fuel ratio portion 48.

Figure 3:
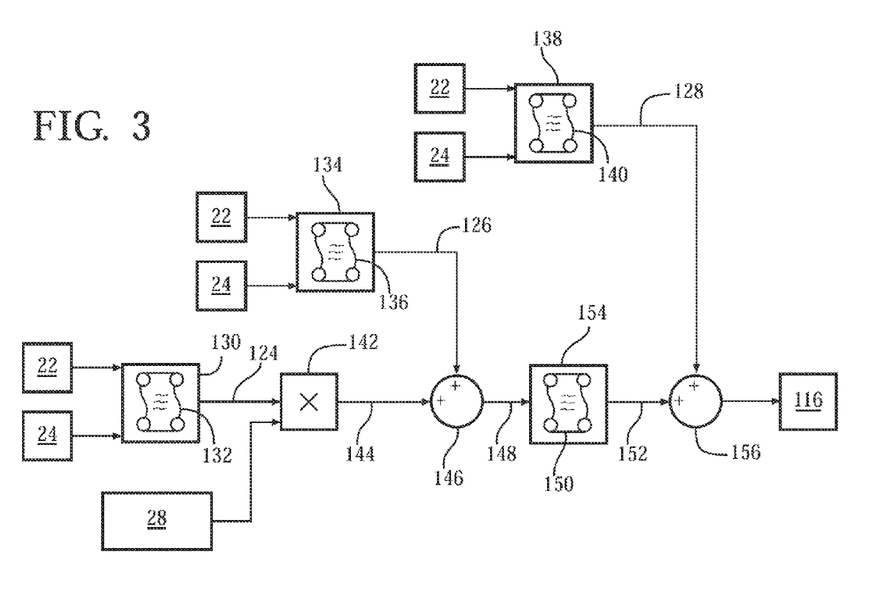
FIG. 3 is a schematic diagram showing a mapping structure for determining a functional timing value of an air/fuel ratio of the engine.

Referring to FIG. 3, the coefficient 124 ($b_1$) for the fuel injection timing 28 is determined and/or defined, generally indicated by box 130, by referencing an AFR-B1 input table 132 stored in the memory of the controller. The AFR-B1 input table 132 may be defined as a two dimensional table, that uses two input values to define an output value. The coefficient 124 ($b_1$)) for the fuel injection timing 28 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the AFR-B1 input table 132, to look-up and/or define the value for the coefficient 124 ($b_1$) for fuel injection timing 28.

The coefficient 124 ($b_1$) is a function of the rotational speed 22 of the engine and the fuel injection rate 24 of the engine. The coefficient 124 ($b_1$) is a constant for any given combination of the rotational speed 22 and the fuel injection rate 24 of the engine. The coefficient 124 ($b_1$) is determined from test data generated for each combination of the rotational speed 22 and the fuel injection rate 24 of the specific engine being used.

As shown in FIG. 3, the adjustment value 126 ($b_2$) for the fuel injection timing 28 is determined and/or defined, generally indicated by box 134, by referencing an AFR-B2 adjustment table 136 stored in the memory of the controller. The AFR-B2 adjustment table 136 may be defined as a two dimensional table, that uses two input values to define an output value. The adjustment value 126 ($b_2$) for the fuel injection timing 28 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the AFR-B2 adjustment table 136, to look-up and/or define the value for the adjustment value 126 ($b_2$) for the fuel injection timing 28.

The adjustment value 126 ($b_2$) is a function of the rotational speed 22 of the engine and the fuel injection rate 24 of the engine. The adjustment value 126 ($b_2$) is a constant for any given combination of the rotational speed 22 and the fuel injection rate 24 of the engine. The adjustment value 126 ($b_2$) is determined from test data generated for each combination of the rotational speed 22 and the fuel injection rate 24 of the specific engine being used.

As shown in FIG. 3, the adjustment value 128 ($b_3$) for the functional timing value 116 of the air/fuel ratio 30 is determined and/or defined, generally indicated by box 138, by referencing an AFR-B3 adjustment table 140 stored in the memory of the controller. The AFR-B3 adjustment table 140 may be defined as a two dimensional table, that uses two input values to define an output value. The adjustment value 128 ($b_3$) for the functional timing value 116 of the air/fuel ratio portion 48 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the AFR-B3 adjustment table 140, to look-up and/or define the value for the adjustment value 128 ($b_3$) for the functional timing value 116 of the air/fuel ratio portion 48.

The adjustment value 128 ($b_3$) is a function of the rotational speed 22 of the engine and the fuel injection rate 24 of the engine. The adjustment value 128 ($b_3$) is a constant for any given combination of the rotational speed 22 and the fuel injection rate 24 of the engine. The adjustment value 128 ($b_3$) is determined from test data generated for each combination of the rotational speed 22 and the fuel injection rate 24 of the specific engine being used.

As shown in FIG. 3, the fuel injection timing 28 (InjT) of the engine at the current operating state is multiplied, generally indicated by box 142, by the coefficient 124 ($b_1$) for the fuel injection timing 28 to define a product 144. The product 144 of the fuel injection timing 28 and the coefficient 124 ($b_1$) for the fuel injection timing 28 is then added, generally indicated by box 146, to the value of the adjustment value 126 ($b_2$) for the fuel injection timing 28 to define a sum 148. The sum 148 is then used as an input into an AFR calibration table 150. The AFR calibration table 150 is a one dimensional table that uses a single input to define a single output value. Accordingly, the output value of the AFR calibration table 150 defines a value 152 of the function $f((b_1)(InjT)+b_2)$. As such, the function $f((b_1)(InjT)+b_2)$ is determined, generally indicated by box 154, from the AFR calibration table 150 based upon the sum 148. Accordingly, the controller may use the sum 148 as the single input into the AFR calibration table 150, to look-up and/or define the value 152 for the function $f((b_1)(InjT)+b_2)$.

The AFR calibration table 150 is universal for the rotational speed 22 and the fuel rate of the engine. The AFR calibration table 150 is developed by adjusting the values of the table to achieve the best estimation of nitrogen oxides mass flow rate at all engine speed 22 and fuel injection rate 24 conditions.

As shown in FIG. 3, the value 152 for the function $f((b_1)(InjT)+b_2)$ is then added, generally indicated by box 156, to the adjustment value 128 ($b_3$) for the functional timing value 116 of the air/fuel ratio portion 48 to define and/or calculate the functional timing value 116 ($f_{AFR}$) of the air/fuel ratio portion 48.

Referring back to FIG. 1, the functional timing value 116 ($f_{AFR}$) of the air/fuel ratio portion 48 is multiplied, generally indicated by box 158, by the logarithmic function (Log) 160 of the quotient 162 of the air/fuel ratio 30 (AFR) of the engine at the current operating state divided by the air/fuel ratio base value 118 ($AFR_{base}$), generally indicated by box 164, to calculate the air/fuel ratio portion 48 (AFRpor) of the nitrogen oxides ratio 4.

The fuel injection pressure portion 50 (InjPpor) is calculated from Equation 7:

$$InjPpor = (a_{InjP})[(InjP)-(InjP_{base})]; \qquad 7)$$

wherein InjP is a fuel injection pressure 26 of the engine at the current operating state, $a_{InjP}$ is an InjP term coefficient 166 for the fuel injection pressure portion 50 of the nitrogen oxides ratio 4, and $InjP_{base}$ is a fuel injection pressure base value 168 of the engine when the engine is operating at the reference state.

The InjP term coefficient 166 for the fuel injection pressure portion 50 of the nitrogen oxides ratio 4 is a function of the rotational speed 22 of the engine and the fuel injection rate 24 of the engine. The InjP term coefficient 166 is a constant for any given combination of the rotational speed 22 and the fuel injection rate 24 of the engine. The InjP term coefficient 166 is determined from test data generated for each combination of the rotational speed 22 and the fuel injection rate 24 of the specific engine being used.

As shown in FIG. 1, defining and/or determining the InjP term coefficient 166 ($a_{InjP}$), generally indicated by box 170, which is used to calculate the fuel injection pressure portion 50 of the nitrogen oxides ratio 4, may include referencing an InjP term table 172 stored in the memory of the controller. The InjP term table 172 may be defined as a two dimensional table, that uses two input values to define an output value. The InjP term coefficient 166 used to calculate the fuel injection pressure portion 50 of the nitrogen oxides ratio 4 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the InjP term table 172, to look-up and/or define the value for the InjP term coefficient 166 used to calculate the fuel injection pressure portion 50 of the nitrogen oxides ratio 4.

The fuel injection pressure base value 168 (InjP$_{base}$) is the fuel injection pressure of the engine when the engine is operating at the reference state. As shown in FIG. 1, defining and/or determining fuel injection pressure base value 168 (InjP$_{base}$), generally indicated by box 174, which is used to calculate the fuel injection pressure portion 50 of the nitrogen oxides ratio 4, may include referencing a InjP base table 176 stored in the memory of the controller. The InjP base table 176 may be defined as a two dimensional table, that uses two input values to define an output value. The fuel injection pressure base value 168 used to calculate the fuel injection pressure portion 50 of the nitrogen oxides ratio 4 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the InjP base table 176, to look-up and/or define the value for the fuel injection pressure base value 168 used to calculate the fuel injection pressure portion 50 of the nitrogen oxides ratio 4.

Referring to FIG. 1, the InjP term coefficient 166, used to calculate the fuel injection pressure portion 50 of the nitrogen oxides ratio 4, is multiplied, generally indicated by box 178, by a difference 180 between the fuel injection pressure 26 of the engine at the current operating state and the fuel injection pressure base value 168 (InjP$_{base}$) used to calculate the fuel injection pressure portion 50 of the nitrogen oxides ratio 4, to calculate the fuel injection pressure portion 50 (InjPpor) of the nitrogen oxides ratio 4. Calculating the difference 180 between the fuel injection pressure 26 of the engine at the current operating state and the fuel injection pressure base value 168 is generally indicated by box 182.

The fuel injection timing portion 52 (InjTpor) is calculated from Equation 8:

$$\text{InjTpor} = (f_{InjT})[(\text{Inj}T) - (\text{Inj}T_{base})]; \qquad 8)$$

wherein InjT is a fuel injection timing 28 of the engine at the current operating state, $f_{InjT}$ is a functional timing value 184 for the fuel injection timing portion 52 of the nitrogen oxides ratio 4, and InjT$_{base}$ is a fuel injection timing base value 186 of the engine when the engine is operating at the reference state.

The fuel injection timing base value 186 (InjT$_{base}$) is the fuel injection timing 28 of the engine when the engine is operating at the reference state. As shown in FIG. 1, defining and/or determining the fuel injection timing base value 186 (InjT$_{base}$), generally indicated by box 188, which is used to calculate the fuel injection timing portion 52 of the nitrogen oxides ratio 4, may include referencing an InjT base table 190 stored in the memory of the controller. The InjT base table 190 may be defined as a two dimensional table, that uses two input values to define an output value. The fuel injection timing base value 186 used to calculate the fuel injection timing portion 52 of the nitrogen oxides ratio 4 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the InjT base table 190, to look-up and/or define the value for the fuel injection timing base value 186 used to calculate the fuel injection timing portion 52 of the nitrogen oxides ratio 4.

The functional timing value 184 ($f_{InjT}$) for the fuel injection timing portion 52 of the nitrogen oxides ratio 4 is determined based upon the rotational speed 22 of the engine at the current operating state, the fuel injection rate 24 of the engine at the current operating state, and the fuel injection timing 28 of the engine at the current operating state. The functional timing value 184 for the fuel injection timing portion 52 of the nitrogen oxides ratio 4 is determined or calculated from Equation 9:

$$f_{InjT} = (f((b_1)(\text{Inj}T) + b_2)) + b_3 \qquad 9)$$

wherein $b_1$ is a coefficient 192 for the fuel injection timing 28; $b_2$ is an adjustment value 194 for the fuel injection timing 28 of the engine; $b_3$ is an adjustment value 196 for the functional timing value 184 of the fuel injection timing portion 52; and InjT is the fuel injection timing 28 of the engine at the current operating state of the engine. The functional timing value 184 ($f_{InjT}$) for the fuel injection timing portion 52 is determined and/or calculated from the coefficient 192 ($b_1$) for the fuel injection timing 28 of the engine, the fuel injection timing 28 of the engine at the current operating state, the adjustment value 194 ($b_2$) for the fuel injection timing 28 of the engine, and the adjustment value 196 ($b_3$) for the functional timing value 184 ($f_{InjT}$) of the fuel injection timing portion 52.

Figure 4:
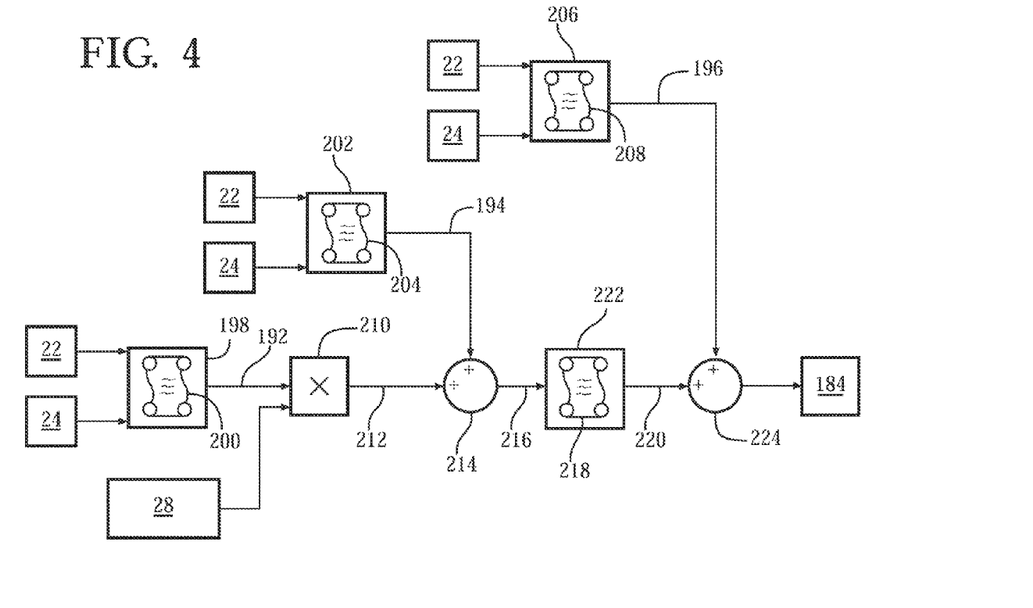
FIG. 4 is a schematic diagram showing a mapping structure for determining a functional timing value of a fuel injection timing of the engine.

Referring to FIG. 4, the coefficient 192 ($b_1$) for the fuel injection timing 28 is determined and/or defined, generally indicated by box 198, by referencing an InjT-B1 input table 200 stored in the memory of the controller. The InjT-B1 input table 200 may be defined as a two dimensional table, that uses two input values to define an output value. The coefficient 192 ($b_1$) for the fuel injection timing 28 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the InjT-B1 input table 200, to look-up and/or define the value for the coefficient 192 ($b_1$) for fuel injection timing 28.

The coefficient 192 ($b_1$) is a function of the rotational speed 22 of the engine and the fuel injection rate 24 of the engine. The coefficient 192 ($b_1$) is a constant for any given combination of the rotational speed 22 and the fuel injection rate 24 of the engine. The coefficient 192 ($b_1$) is determined from test data generated for each combination of the rotational speed 22 and the fuel injection rate 24 of the specific engine being used.

As shown in FIG. 4, the adjustment value 194 ($b_2$) for the fuel injection timing 28 is determined and/or defined, generally indicated by box 202, by referencing an InjT-B2 adjustment table 204 stored in the memory of the controller. The InjT-B2 adjustment table 204 may be defined as a two dimensional table, that uses two input values to define an output value. The adjustment value 194 ($b_2$) for the fuel injection timing 28 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the InjT-B2 adjustment table 204, to look-up and/or define the value for the adjustment value 196 ($b_2$) for the fuel injection timing 28.

The adjustment value 194 ($b_2$) is a function of the rotational speed 22 of the engine and the fuel injection rate 24 of the engine. The adjustment value 194 ($b_2$) is a constant for any given combination of the rotational speed 22 and the fuel injection rate 24 of the engine. The adjustment value 194 (b$_2$) is determined from test data generated for each combination of the rotational speed 22 and the fuel injection rate 24 of the specific engine being used.

As shown in FIG. 4, the adjustment value 196 (b$_3$) for the functional timing value 184 of the fuel injection timing portion 52 is determined and/or defined, generally indicated by box 206, by referencing an InjT-B3 adjustment table 208 stored in the memory of the controller. The InjT-B3 adjustment table 208 may be defined as a two dimensional table, that uses two input values to define an output value. The adjustment value 196 (b$_3$) for the functional timing value 184 of the fuel injection timing portion 52 is based upon the rotational speed 22 of the engine and the fuel injection rate 24 of the engine at the current operating state. Accordingly, the controller may use the rotational speed 22 of the engine and the fuel injection rate 24 of the engine at the current operating state as the two inputs into the InjT-B3 adjustment table 208, to look-up and/or define the value for the adjustment value 196 (b$_3$) for the functional timing value 184 of the fuel injection timing portion 52.

The adjustment value 196 (b$_3$) for the functional timing value 184 of the fuel injection timing portion 52 is a function of the rotational speed 22 of the engine and the fuel injection rate 24 of the engine. The adjustment value 196 (b$_3$) is a constant for any given combination of the rotational speed 22 and the fuel injection rate 24 of the engine. The adjustment value 196 (b$_3$) is determined from test data generated for each combination of the rotational speed 22 and the fuel injection rate 24 of the specific engine being used.

As shown in FIG. 4, the fuel injection timing 28 (InjT) of the engine at the current operating state is multiplied, generally indicated by box 210, by the coefficient 192 (b$_1$) for the fuel injection timing 28 to define a product 212. The product 212 of the fuel injection timing 28 and the coefficient 192 (b$_1$) for the fuel injection timing 28 is then added, generally indicated by box 214, to the value of the adjustment value 194 (b$_2$) for the fuel injection timing 28 to define a sum 216. The sum 216 is then used as an input into an InjT calibration table 218. The InjT calibration table 218 is a one dimensional table that uses a single input to define a single output value. Accordingly, an output value 220 of the InjT calibration table 218 defines the value of the function $f((b_1)(InjT)+b_2)$. As such, the function $f((b_1)InjT)+b_2)$ is determined, generally indicated by box 222, from the InjT calibration table 218 based upon the sum 216. Accordingly, the controller may use the sum 216 as the single input into the InjT calibration table 218, to look-up and/or define the value 220 for the function $((b_1)(InjT)+b_2)$.

The InjT calibration table 218 is universal for the rotational speed 22 and the fuel injection rate 24 of the engine. The InjT calibration table 218 is developed by adjusting the values of the table to achieve the best estimation of nitrogen oxides mass flow rate at all rotational speed 22 and fuel injection rate 24 conditions.

As shown in FIG. 4, the value 220 for the function $f((b_1)(InjT)+b_2)$ is then added, generally indicated by box 224, to the adjustment value 196 (b$_3$) for the functional timing value 184 of the fuel injection timing portion 52 to define and/or calculate the functional timing value 184 ($f_{InjT}$) of the fuel injection timing portion 52.

Referring back to FIG. 1, the functional timing value 184 ($f_{InjT}$) of the fuel injection timing portion 52 is multiplied, generally indicated by box 226, by a difference 228 between the fuel injection timing 28 (InjT) of the engine at the current operating state and the fuel injection timing base value 186 (InjTj$_{base}$) used to calculate the fuel injection timing portion 52 of the nitrogen oxides ratio 4, to calculate the fuel injection timing portion 52 (InjTpor) of the current nitrogen oxides ratio 4. Calculating the difference 228 between the fuel injection timing 28 (InjT) of the engine at the current operating state and the fuel injection timing base value 186 (InjTj$_{base}$) is generally indicated by box 230.

As noted above, the nitrogen oxides ratio 4 of the engine is calculated from Equation 2:

$$\text{NOxratio} = e^{((\text{EGRpor})+(\text{AFRpor})+(\text{InjPpor})+(\text{InjTpor}))} \quad\quad 2)$$

Accordingly, referring to FIG. 1, the exhaust gas recirculation portion 46 (EGRpor) of the nitrogen oxides ratio 4, the air/fuel ratio portion 48 (AFRpor) of the nitrogen oxides ratio 4, the fuel injection pressure portion 50 (InjPpor) of the nitrogen oxides ratio 4, and the fuel injection timing portion 52 (InjTpor) of the nitrogen oxides ratio 4 are added together, generally indicated by box 232, to define an exponent 234. The exponent 234 is then used to solve the exponential function ($e^x$), generally indicated by box 236. The solution of the exponential function defines the nitrogen oxides ratio 4.

As noted above, the estimated value of the current mass flow rate of nitrogen oxides 20 in the exhaust gas from the engine is calculated from Equation 1:

$$\text{MFR\_NOx} = (M_{exh})(\text{NOx}_{base})(\text{NOxratio}); \quad\quad 1)$$

Accordingly, referring to FIG. 1, the nitrogen oxides base concentration 38 of the engine, the nitrogen oxides ratio 4, and the mass flow rate 36 of the exhaust gas are multiplied together, generally indicated by box 238, to define or calculate the estimated value of the current mass flow rate of nitrogen oxides 20 in the exhaust gas from the engine.

The estimated value of the current mass flow rate of nitrogen oxides 20 in the exhaust gas, calculated from the method described above, may be used by the engine control unit to directly control the engine and/or the exhaust gas treatment system, or may be used by an on-board diagnostic computer, to diagnose the functionality of a nitrogen oxides sensor of the exhaust gas treatment system. For example, the on-board diagnostic computer may compare the estimated value of the current mass flow rate of nitrogen oxides 20 in the flow of exhaust gas, to a sensed value of the mass flow rate of nitrogen oxides 20 in the flow of exhaust gas, sensed by the nitrogen oxides sensor of the exhaust gas treatment system, to determine if the nitrogen oxides sensor is operating properly. If the sensed level of nitrogen oxides is approximately equal to the estimated value of nitrogen oxides, then the on-board diagnostic computer may determine that the nitrogen oxides sensor is operating properly. However, if the sensed level of nitrogen oxides is not approximately equal to the estimated value of nitrogen oxides, then the on-board diagnostic computer may determine that the nitrogen oxides sensor is not operating properly, and may signal a maintenance alert.

The detailed description and the drawings or figures are supportive and descriptive of the disclosure, but the scope of the teachings is defined solely by the claims. While some of the best modes and other embodiments for carrying out the claimed teachings have been described in detail, various alternative designs and embodiments exist for practicing the teachings defined in the appended claims.

The invention claimed is:

1. A method of estimating a mass flow rate of nitrogen oxides (NOx) in exhaust gas produced by an engine, the method comprising:

sensing a mass flow rate of a flow of exhaust gas from the engine;

defining a nitrogen oxides base concentration for when the engine is operating at a reference state, with an engine control unit;

calculating a nitrogen oxides ratio for a current operating state of the engine, with the engine control unit; and multiplying the mass flow rate of the flow of exhaust gas, the nitrogen oxides base concentration, and the nitrogen oxides ratio for the current operating state of the engine to define an estimated value of the current mass flow rate of nitrogen oxides in the flow of exhaust gas from the engine.

2. The method set forth in claim 1 wherein the nitrogen oxides ratio (NOxratio) for the current operating state of the engine is calculated from the equation:

NOxratio=$e((EGRpor)+(AFRpor)+(InjPpor)+(InjTpor))$;

wherein the EGRpor is an exhaust gas recirculation portion of the nitrogen oxides ratio AFRpor is an air/fuel ratio portion of the nitrogen oxides ratio, InjPpor is a fuel injection pressure portion of the nitrogen oxides ratio, and InjTpor is a fuel injection timing portion of the nitrogen oxides ratio;

wherein the exhaust gas recirculation portion is calculated from the equation:

EGRpor=$[(a_{EGR})(AFR)+(f_{EGR})][(EGR)-(EGR_{base})]$;

wherein AFR is the air/fuel ratio of the engine at the current operating state, EGR is an exhaust gas recirculation ratio of the engine at the current operating state, aEGR is an EGR term coefficient for the exhaust gas recirculation ratio, fEGR is a functional timing value of the exhaust gas recirculation ratio, and $EGR_{base}$ is an exhaust gas recirculation base ratio of the engine when the engine is operating at the reference state;

wherein the air/fuel ratio portion is calculated from the equation:

$$AFRpor = (f_{AFR})\ln\left(\frac{AFR}{AFR_{base}}\right);$$

wherein AFR is an air/fuel ratio of the engine at the current operating state, $f_{AFR}$ is a functional timing value of the air/fuel ratio, and $AFR_{base}$ is an air/fuel ratio base value of the engine when the engine is operating at the reference state;

wherein the fuel injection pressure portion is calculated from the equation:

InjPpor=$(a_{InjP})[(InjP)=(InjP_{base})]$;

wherein InjP is a fuel injection pressure of the engine at the current operating state, $a_{InjP}$ is an InjP term coefficient for the air/fuel ratio, and InjP base is a fuel injection pressure base value of the engine when the engine is operating at the reference state; and wherein the fuel injection timing portion is calculated from the equation:

InjTpor=$(f_{InjT})[(InjT)<(InjT_{base})]$;

wherein InjT is a fuel injection timing of the engine at the current operating state, fIniT is a functional value of the fuel injection timing of the engine, and $InjT_{base}$ is a fuel injection timing base value of the engine when the engine is operating at the reference state.

3. The method set forth in claim 2 wherein defining the nitrogen oxides base concentration of the engine when the engine is operating at the reference state includes referencing a table to determine the nitrogen oxides base concentration based upon a rotational speed of the engine and a fuel injection rate of the engine at the current operating state.

4. The method set forth in claim 2 further comprising sensing the air/fuel ratio of the engine at the current operating state, sensing the exhaust gas recirculation ratio of the engine at the current operating state, sensing the fuel injection timing of the engine at the current operating state, sensing the fuel injection pressure of the engine at the current operating state, sensing a rotational speed of the engine at the current operating state, and sensing a fuel injection rate of the engine at the current operating state.

5. The method set forth in claim 4 further comprising referencing a table to determine the EGR term coefficient used to calculate the exhaust gas recirculation portion of the nitrogen oxides ratio, based upon the rotational speed of the engine at the current operating state, and the fuel injection rate of the engine at the current operating state.

6. The method set forth in claim 5 further comprising referencing a table to determine the exhaust gas recirculation base ratio used to calculate the exhaust gas recirculation portion of the nitrogen oxides ratio, based upon the rotational speed of the engine at the current operating state, and the fuel injection rate of the engine at the current operating state.

7. The method set forth in claim 6 further comprising determining the functional timing value of the exhaust gas recirculation ratio based upon the rotational speed of the engine at the current operating state, the fuel injection rate of the engine at the current operating state, and the fuel injection timing of the engine at the current operating state.

8. The method set forth in claim 7 wherein determining the functional timing value of the exhaust gas recirculation ratio includes calculating the functional timing value of the exhaust gas recirculation ratio from the equation:

$f_{EGR}$=$(f((b_1)(InjT)+b_2))+b_3$ wherein $b_1$ is a coefficient for the fuel injection timing determined from a table based upon the rotational speed of the engine at the current operating state, and the fuel injection rate of the engine at the current operating state;

wherein $b_2$ is an adjustment value for the fuel injection timing of the engine determined from a table based upon the rotational speed of the engine at the current operating state, and the fuel injection rate of the engine at the current operating state;

wherein $b_3$ is an adjustment value of the functional timing value of the exhaust gas recirculation ratio determined from a table based upon the rotational speed of the engine at the current operating state, and the fuel injection rate of the engine at the current operating state; and wherein $f((b_1)(InjT)+b_2)$ is determined from a table based upon the product of the coefficient $b_1$ for the fuel injection timing of the engine and the fuel injection timing of the engine at the current operating state, adjusted by the addition of the adjustment value $b_2$ for the fuel injection timing of the engine.

9. The method set forth in claim 4 further comprising referencing a table to determine the air/fuel ratio base value used to calculate the air/fuel ratio portion of the nitrogen oxides ratio, based upon the rotational speed of the engine at the current operating state, and the fuel injection rate of the engine at the current operating state.

10. The method set forth in claim 9 further comprising determining the functional timing value of the air/fuel ratio based upon the rotational speed of the engine at the current operating state, the fuel injection rate of the engine at the current operating state, and the fuel injection timing of the engine at the current operating state.

11. The method set forth in claim 10 wherein determining the functional timing value of the air/fuel ratio includes calculating the functional timing value of the air/fuel ratio from the equation:

$$f_{AFR} = (f((b_1)(InjT) + b_2)) + b_3$$

wherein $b_1$ is a coefficient for the fuel injection timing of the engine determined from a table based upon the rotational speed of the engine at the current operating state, and the fuel injection rate of the engine at the current operating state;

wherein $b_2$ is an adjustment value for the fuel injection timing of the engine determined from a table based upon the rotational speed of the engine at the current operating state, and the fuel injection rate of the engine at the current operating state;

wherein $b_3$ is an adjustment value of the functional timing value of the air/fuel ratio determined from a table based upon the rotational speed of the engine at the current operating state, and the fuel injection rate of the engine at the current operating state; and wherein $f((b_1)(InjT) + b_2)$ is determined from a table based upon the product of the coefficient $b_1$ for the fuel injection timing of the engine and the fuel injection timing of the engine at the current operating state, adjusted by the addition of the adjustment value $b_2$ for the fuel injection timing of the engine.

12. The method set forth in claim 4 further comprising referencing a table to determine the InjP term coefficient used to calculate the fuel injection pressure portion of the nitrogen oxides ratio, based upon the rotational speed of the engine at the current operating state, and the fuel injection rate of the engine at the current operating state.

13. The method set forth in claim 12 further comprising referencing a table to determine the fuel injection pressure base value used to calculate the fuel injection pressure portion of the nitrogen oxides ratio, based upon the rotational speed of the engine at the current operating state, and the fuel injection rate of the engine at the current operating state.

14. The method set forth in claim 4 further comprising referencing a table to determine the fuel injection timing base value used to calculate the fuel injection timing portion of the nitrogen oxides ratio, based upon the rotational speed of the engine at the current operating state, and the fuel injection rate of the engine at the current operating state.

15. The method set forth in claim 14 further comprising determining the functional timing value of the fuel injection timing based upon the rotational speed of the engine at the current operating state, the fuel injection rate of the engine at the current operating state, and the fuel injection timing of the engine at the current operating state.

16. The method set forth in claim 15 wherein determining the functional timing value of the fuel injection timing includes calculating the functional timing value of the fuel injection timing from the equation:

$$f_{InjT} = (f(b_1)(InjT) + b_2)) + b_3$$

wherein $b_1$ is a coefficient for the fuel injection timing of the engine determined from a table based upon the rotational speed of the engine at the current operating state, and the fuel injection rate of the engine at the current operating state;

wherein $b_2$ is an adjustment value for the fuel injection timing of the engine determined from a table based upon the rotational speed of the engine at the current operating state, and the fuel injection rate of the engine at the current operating state;

wherein $b_3$ is an adjustment value of the functional timing value of the fuel injection timing determined from a table based upon the rotational speed of the engine at the current operating state, and the fuel injection rate of the engine at the current operating state; and wherein $f((b_1)(InjT) + b_2)$ is determined from a table based upon the product of the coefficient $b_1$ for the fuel injection timing of the engine and the fuel injection timing of the engine at the current operating state, adjusted by the addition of the adjustment value $b_2$ for the fuel injection timing of the engine.

17. A method as set forth in claim 1 further comprising comparing the estimated value of the current mass flow rate of nitrogen oxides in the flow of exhaust gas to a sensed value of the mass flow rate of nitrogen oxides in the flow of exhaust gas, sensed by a nitrogen oxides sensor of an exhaust gas treatment system, to determine if the nitrogen oxides sensor is operating properly.

18. A method of diagnosing a nitrogen oxide sensor of an exhaust gas treatment system of a vehicle, the method comprising:

sensing a mass flow rate of a flow of exhaust gas from the engine;

defining a nitrogen oxides base concentration of the engine, with a engine control unit, when the engine is operating at a reference state;

calculating a nitrogen oxides ratio for a current operating state of the internal combustion engine, with the engine control unit; and multiplying the mass flow rate of the flow of exhaust gas, the nitrogen oxides base concentration, and the nitrogen oxides ratio for the current operating state of the engine to define an estimated value of the current mass flow rate of nitrogen oxides in the flow of exhaust gas from the engine; and comparing the estimated value of the current mass flow rate of nitrogen oxides in the flow of exhaust gas to a sensed value of the mass flow rate of nitrogen oxides in the flow of exhaust gas, sensed by the nitrogen oxides sensor of the exhaust gas treatment system, to determine if the nitrogen oxides sensor is operating properly;

wherein the nitrogen oxides ratio (NOxratio) for the current operating state of the engine is calculated from the equation:

$$NOxratio = e((EGRpor) + (AFRpor) + (InjPpor) + (InjTpor));$$

wherein the EGRpor is an exhaust gas recirculation portion of the nitrogen oxides ratio AFRpor is an air/fuel ratio portion of the nitrogen oxides ratio, InjPpor is a fuel injection pressure portion of the nitrogen oxides ratio, and InjTpor is a fuel injection timing portion of the nitrogen oxides ratio;

wherein the exhaust gas recirculation portion is calculated from the equation:

$$EGRpor = [(a_{EGR})(EGR) + (f_{EGR})][(EGR) - (EGR_{base})];$$

wherein EGR is an exhaust gas recirculation ratio of the engine at the current operating state, aEGR is an EGR term coefficient for the exhaust gas recirculation ratio, fEGR is a functional timing value of the exhaust gas recirculation ratio, and $EGR_{base}$ is an exhaust gas recirculation base ratio of the engine when the engine is operating at the reference state;

wherein the air/fuel ratio portion is calculated from the equation:

$$AFRpor = (f_{AFR})\ln\left(\frac{AFR}{AFR_{base}}\right);$$

wherein AFR is an air/fuel ratio of the engine at the current operating state, $f_{AFR}$ is a functional timing value of the air/fuel ratio, and $AFR_{base}$ is an air/fuel ratio base value of the engine when the engine is operating at the reference state;

wherein the fuel injection pressure portion is calculated from the equation:

$$InjPpor = (a_{InjP})[(InjP)-(InjP)-(InjP_{base})];$$

wherein InjP is a fuel injection pressure of the engine at the current operating state, $a_{InjP}$ is an InjP term coefficient for the air/fuel ratio, and $InjP_{base}$ is a fuel injection pressure base value of the engine when the engine is operating at the reference state; and wherein the fuel injection timing portion is calculated from the equation:

$$InjTpor = (f_{InjT})[(InjT)-(InjT_{base})];$$

wherein InjT is a fuel injection timing of the engine at the current operating state, $f_{InjT}$ is a functional value of the fuel injection timing of the engine, and $InjT_{base}$ is a fuel injection timing base value of the engine when the engine is operating at the reference state.

* * * * *

UNITED STATES PATENT AND TRADEMARK OFFICE
CERTIFICATE OF CORRECTION

PATENT NO. : 9,453,450 B2
APPLICATION NO. : 14/299285
DATED : September 27, 2016
INVENTOR(S) : Min Sun et al.

It is certified that error appears in the above-identified patent and that said Letters Patent is hereby corrected as shown below:

In the Specification

Column 4, Line 52: Delete "NOxratio=e((EGRpor)+(AFRpor)+(InjPpor)+(InjTpor))" and insert --$NOxratio = e((EGRpor)+(AFRpor)+(InjPpor)+(InjTpor))$--

In the Claims

Column 15, Line 15: Delete "NOxratio=e((EGRpor)+(AFRpor)+(InjPpor)+(InjTpor))" and insert --$NOxratio = e((EGRpor)+(AFRpor)+(InjPpor)+(InjTpor))$--

Column 15, Line 50: Delete "InjPpor=(a$_{InjP}$)[(InjP)=(InjP$_{base}$)]" and insert --$InjPpor = (a_{InjP})[(InjP) - (InjP_{base})]$--

Column 15, Line 54: Delete "InjP base" and insert --$InjP_{base}$--

Column 15, Line 60: Delete "InjTpor=(f$_{InjT}$)[(InjT)<(InjT$_{base}$)]" and insert --$InjTpor = (f_{InjT})[(InjT) - (InjT_{base})]$--

Column 15, Line 62: Delete "fIniT" and insert --$f_{InjT}$--

Column 17, Line 65: Delete "f$_{InjT}$=(f(b$_1$)(InjT)+b$_2$))+b$_3$" and insert --$f_{InjT} = (f((b_1)(InjT) + b_2)) + b_3$--

Column 18, Line 55: Delete "NOxratio=e((EGRpor)+(AFRpor)+(InjPpor)+(InjTpor))" and insert --$NOxratio = e((EGRpor)+(AFRpor)+(InjPpor)+(InjTpor))$--

Column 19, Line 2: Delete "aEGR" and insert --$a_{EGR}$--

Column 19, Line 3: Delete "fEGR" and insert --$f_{EGR}$--

Signed and Sealed this
Twenty-first Day of March, 2017

Michelle K. Lee
*Director of the United States Patent and Trademark Office*

Column 20, Line 3: Delete "$InjPpor=(a_{InjP})[(InjP)-(InjP)-(InjP_{base})]$" and insert
--$InjPpor = (a_{InjP})[(InjP) - (InjP_{base})]$--